United States Patent [19]

Ehlers et al.

[11] 4,200,620

[45] Apr. 29, 1980

[54] DECONTAMINATION OF WET-PROCESSED PHOSPHORIC ACID

[75] Inventors: Klaus-Peter Ehlers, Erftstadt; Wolfgang Scheibitz, Hürth-Knapsack; Klaus Schrödter, Cologne; Gero Heymer, Erftstadt, all of Fed. Rep. of Germany

[73] Assignee: Hoechst Aktiengesellschaft, Fed. Rep. of Germany

[21] Appl. No.: 859,879

[22] Filed: Dec. 12, 1977

[30] Foreign Application Priority Data

Dec. 17, 1976 [DE] Fed. Rep. of Germany ....... 2657190

[51] Int. Cl.² ........................................... C01B 25/16
[52] U.S. Cl. ............................................... 423/321 S
[58] Field of Search ................................... 423/321 S

[56] References Cited

U.S. PATENT DOCUMENTS

| 3,684,439 | 8/1972 | Rose et al. | 423/321 S |
| 3,953,581 | 4/1976 | Ehlers et al. | 423/321 S |
| 3,956,465 | 5/1976 | Amanrich | 423/321 S |

FOREIGN PATENT DOCUMENTS

| 2605106 | 8/1977 | Fed. Rep. of Germany | 423/321 S |
| 1326911 | 8/1973 | United Kingdom | 423/321 S |

OTHER PUBLICATIONS

Treybal, Liquid Extraction, 1963, pp. 225–239.

*Primary Examiner*—Wayne A. Langel
*Attorney, Agent, or Firm*—Connolly and Hutz

[57] ABSTRACT

Wet-processed phosphoric acid is decontaminated. To this end, the phosphoric acid and an organic solvent, which is partially miscible with water and capable of absorbing phosphoric acid, are contacted countercurrently with respect to one another. The resulting organic phosphoric acid solution is separated from contaminants unabsorbed by the solvent, termed primary raffinate, decontaminated phosphoric acid is recovered either in the form of free acid by re-extracting the organic phosphoric acid solution with water, or in the form of an alkali metal phosphate by reacting the organic phosphoric acid solution with an alkali, and the primary raffinate is treated countercurrently with a solvent containing a mineral acid. More specifically, the organic phosphoric acid extract, which orginates from the primary raffinate treatment and contains more than 0 up to at most 10 weight% of water, is mixed with an anhydrous solvent in a ratio by weight necessary to ensure the formation of a mixture containing more than 0 and less than 50% of water than would correspond to the saturation concentration of water in the solvent; and the mixture is contacted countercurrently with the phosphoric acid which is to be decontaminated.

16 Claims, 1 Drawing Figure

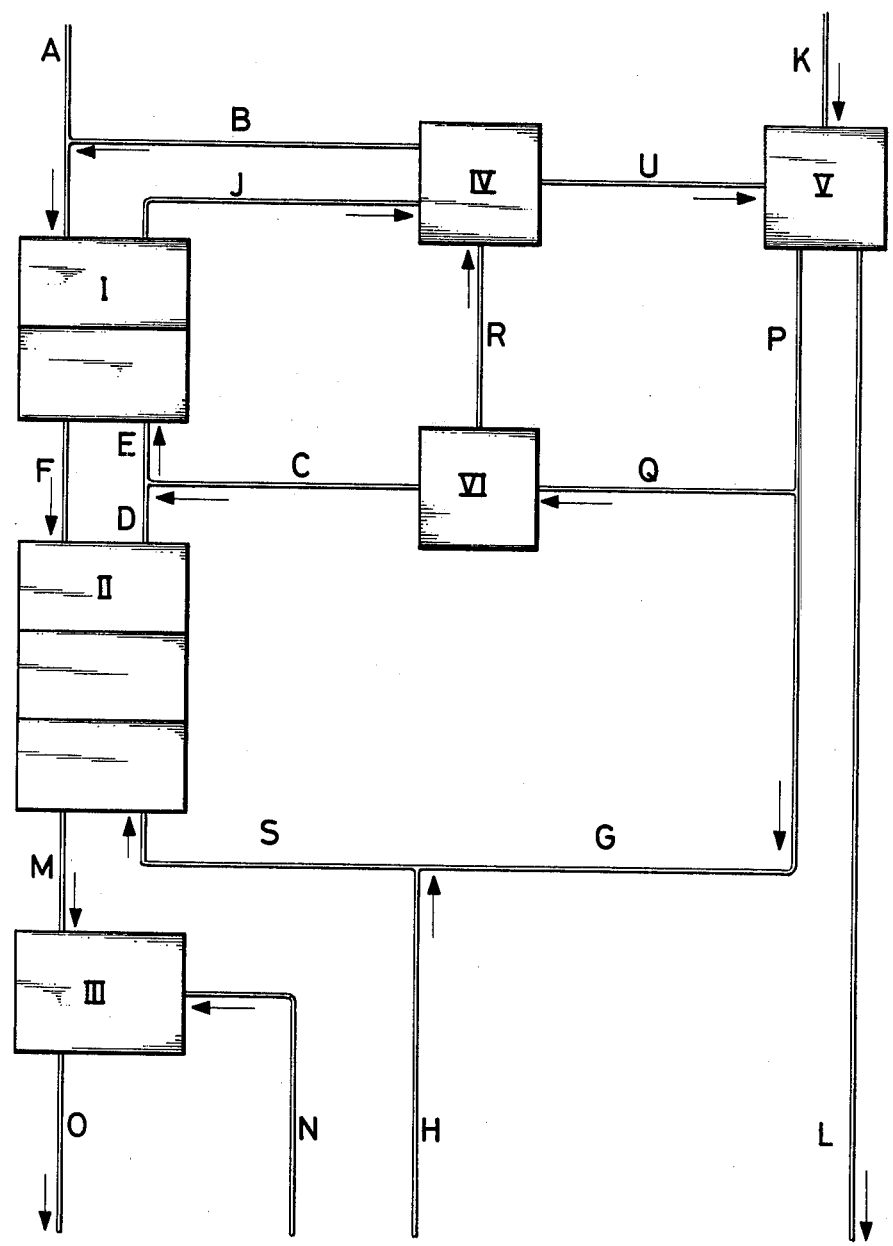

DECONTAMINATION OF WET-PROCESSED PHOSPHORIC ACID

This invention relates to a process for purifying wet-processed phosphoric acid, wherein the phosphoric acid to be purified and an organic solvent, which is partially miscible with water and capable of absorbing phosphoric acid, are contacted countercurrently with respect to one another, the resulting organic phosphoric acid solution—termed primary extract—is separated from contaminants unabsorbed by the solvent—termed primary raffinate—, decontaminated phosphoric acid is recovered either in the form of free acid by re-extracting the organic phosphoric acid solution with water, or in the form of an alkali metal phosphate by reacting the organic phosphoric acid solution with an alkali, and the primary raffinate is treated countercurrently with a solvent containing a mineral acid so as to obtain a secondary extract.

It has been described that phosphoric acid can be purified with the use of an anhydrous solvent which is partially miscible with water. In the process described in U.S. Pat. No. 3,953,581, the organic solvent is employed in a quantity which is necessary to dissolve therein all of the uncombined phosphoric acid and all of the uncombined water in the crude acid. This is, however, not fully satisfactory inasmuch as the residue—also termed primary raffinate—with the contaminants therein is obtained in the form of viscous or even solid material, depending on the particular crude acid used; this residue is difficult to handle and solvent may be occluded therein.

It has also been suggested that the above solvents should be used in a form in which they contain 40 to 50% less water than they would contain if saturated therewith. This process, which has been disclosed in U.S. Pat. No. 3,956,465 is disadvantageous in respect of the following points: In order to quantitatively extract the phosphoric acid, it is necessary to use the solvent and acid in an increased ratio and to effect the extraction in a plurality of processing stages, substantially in accordance with the law of distribution of a substance between two liquid phases.

The resulting residue with the contaminants therein contains up to more than 60% of water which is disadvantageous as it is normally necessary to free the residue from water, e.g. by concentration, and convert it into material which can readily be disposed of. The residues concerned constitute concentrated solutions of acid salts and these are technically difficult to concentrate.

Further processes have been described, wherein phosphoric acid is recovered from phosphate-containing residues by treatment with a mineral acid and absorption of the resulting phosphoric acid in an organic solvent. These processes are normally combined with the decontamination of wet-processed phosphoric acid and intended to increase the total yield of $P_2O_5$.

It is therefore an object of the present invention to provide a process for decontaminating wet-processed phosphoric acid under conditions which ensure:

(a) the absorption of phosphoric acid in the solvent with the use of a minimum acid to solvent ratio and in a minimum of stages;

(b) the recovery of a maximum of decontaminated $P_2O_5$; and (c) the formation of final raffinate containing the quantity of water just necessary for uncomplicated manipulation and conversion to material which can be readily disposed of.

To this end, the invention now provides a process which comprises: mixing the organic phosphoric acid extract—also termed secondary extract—which originates from the primary raffinate treatment and contains more than 0 up to at most 10 weight% of water, with an anhydrous solvent in a ratio by weight necessary to ensure the formation of a mixture containing more than 0 and less than 50% of water than would correspond to the saturation concentration of water in the solvent, and contacting the said mixture countercurrently with the phosphoric acid which is to be decontaminated.

It is preferable to extract the raffinate with an organic solvent which is the same as that used for absorbing phosphoric acid from wet-processed phosphoric acid.

The organic solvents which should more preferably be used comprise $C_5$-alcohols.

It is good practice to employ the anhydrous solvent in a quantity necessary to absorb therein all of the liquid phosphoric acid contained in the wet-processed phosphoric acid, which is to be decontaminated, and also all of the uncombined water present in the wet-processed phosphoric acid.

The quantities of anhydrous solvent needed depend on the $P_2O_5$-concentration of the wet-processed phosphoric acid which is to be decontaminated, increased quantities of solvent being used for a decreasing $P_2O_5$-concentration.

In the event of the solvent being a $C_5$-alcohol and the acid containing 50, 40 or 30 weight % of $P_2O_5$, respectively, the alcohol is used in a proportion of about 2.5, 6 or 9 parts by volume, respectively, per part by volume of acid.

The organic phosphoric acid extract (secondary extract) which originates from the primary raffinate treatment, should preferably be mixed with the anhydrous solvent in a quantitative ratio necessary for the resulting mixture to contain a proportion of water which corresponds to 10–30% of the saturation concentration of water in the solvent. After recovery of the decontaminated phosphoric acid, the solvent is recycled in customary manner.

The solvent which is recycled should preferably be dehydrated partially and the dehydrated portion should be used for dissolving wet-processed phosphoric acid therein. The portion, which is not dehydrated, should conveniently be used directly for extracting the raffinate. The primary raffinate should preferably be extracted by using the solvent and raffinate in a ratio by volume of 4:1 to 8:1, more preferably about 6:1. It is also good practice to use the mineral acid in concentrated form in the quantity necessary to provide about 1 acid equivalent per 1 gram atom of P, in the raffinate. Sulfuric acid is the mineral acid which should most preferably be employed.

The extraction of the raffinate can be effected at temperatures of 0° to 98° C., but it is preferable to operate at 20° to 60° C. The countercurrent extraction of the primary raffinate is effected in 2 to 10, preferably 3 to 5, stages. The secondary raffinate, which originates from the extraction of the primary raffinate, is reacted with quicklime and converted to a solid, neutral residue which can readily be discarded.

The process of the present invention is more preferably carried out as described hereinafter with reference to the accompanying flow scheme.

A primary raffinate F is extracted with the aid of a solvent S containing water and a mineral acid, in a countercurrent extraction stage II. The resulting secondary extract D containing phosphoric acid is mixed with an anhydrous solvent C so as to obtain an extract-solvent-mixture E. A mixture T, consisting of wet-processed phosphoric acid A, which is to be decontaminated, and a scrubbing solution B, which originates from a scrubbing stage IV, is treated in a second countercurrent stage I with the extract-solvent-mixture E and a further quantity of primary raffinate F is obtained together with a primary extract J consisting of an organic phosphoric acid solution. The latter is conveyed towards the scrubbing stage IV, which is also fed with an aqueous phase R, which originates from an azeotropic distillation stage VI. Removed from the scrubbing stage IV is (1) the above scrubbing solution B and (2) a scrubbed organic phosphoric acid solution U which originates from the primary extract J. This phosphoric acid solution U is converted either to decontaminated phosphoric acid L by re-extracting it with water K in a stage V, or to alkali metal phosphate by reaction with an alkali. A portion Q of a resulting hydrous solvent P is delivered to the azeotropic distillation stage VI and another portion G, which is mixed with a mineral acid H, is delivered as the solvent S containing water and mineral acid, to the countercurrent extraction stage II receiving the primary raffinate F. The anhydrous solvent C, which originates from the azeotropic distillation stage VI, is used for making the above extract-solvent-mixture E. Secondary raffinate M, which is obtained upon the countercurrent extraction of the primary raffinate F in stage II, is reacted with quicklime in a reactor III to give a solid residue O which can be discarded.

The process of the present invention offers the following advantages:

The power for absorbing water of the partially water-miscible, anhydrous organic solvent, which is used for separating phosphoric acid from its contaminants and for absorbing it, remains unaffected by being mixed with the hydrous secondary extract which originates from the mineral acid treatment of the primary raffinate. In other words, the solvent has the power necessary for absorption of the phosphoric acid together with all of the uncombined water present in the wet-processed phosphoric acid. At the same time, by mixing the anhydrous solvent with the secondary extract and using the resulting mixture for treatment of the crude acid, it is possible to produce a primary raffinate which is flowable and easy to work.

On subjecting the primary raffinate to the mineral acid treatment for conversion to secondary raffinate of substantially constant water-content, the flow properties are even further improved.

This unexpected result, which more specifically would not have been expected to accompany the use of a non-water saturated solvent, can be explained with the different composition of the raffinates. More precisely, the primary raffinate consists substantially of phosphate salts and the secondary raffinate constitutes a mixture of acid salts to the mineral acids employed and that acid.

All of the phosphoric acid is absorbed in a two-stage countercurrent operation with the use of relatively small quantities of solvent.

The secondary raffinate contains little $P_2O_5$, i.e. less than 3% for acids made from Morocco-phosphate and less than 5% for acids made from Florida-phosphate, the percentage being based on the total $P_2O_5$.

In addition to this, it is possible without prior separation of water to convert the secondary raffinate under ecologically beneficial conditions, e.g. by reacting it with quicklime, into material which can be readily discarded. The minor proportion of water therein is either evaporated or sequestered by the forming salts.

One of the solvents which is suitable for use in the present process together with a plurality of further partially water-miscible solvents is the $C_5$-alcohol mixture originating from an oxo-synthesis.

The following Examples illustrate the invention which is however not limited thereto:

EXAMPLE 1:

A commercial grade crude phosphoric acid made from Morocco-phosphate ore, which contained 50.2 weight% of $P_2O_5$ and the following principal contaminants in percent, based on $P_2O_5$, was used:

Fe—4070 ppm
Al—2200 ppm
Mg—8460 ppm
Ca—2500 ppm
V—460 ppm
Mn—80 ppm
$SO_4$—1500 ppm 23.12 metric tons of this crude acid A and 3.20 metric tons of recycled scrubbing solution B were treated within 60 hours in a two-stage countercurrent extraction unit I with 49.62 metric tons of anhydrous amyl alcohol C, which came from an oxo-synthesis, and 14.03 metric tons of an organic secondary extract D, which came from the three-stage countercurrent extraction unit II fed with primary raffinate F. The mixture E comprising the two organic phases C and D contained 2.1 weight% of $H_2O$. 3.45 metric tons of almost solid primary raffinate F was delivered to the above countercurrent extraction unit II and contacted therein at 25° C. with the mixture S, which consisted of 13.82 metric tons of water-saturated amyl alcohol G in admixture with 0.52 metric ton of concentrated sulfuric acid (96% of $H_2SO_4$). Secondary extract D, which came from this extraction unit II, was used as described hereinabove. The treatment of the crude acid A in the countercurrent unit I gave altogether 86.43 metric tons of primary extract J which contained 15.1 weight% of $P_2O_5$. It was scrubbed in a multistage scrubbing zone IV and re-extracted in a multistage re-extraction zone V with water K, and 32.36 metric tons of decontaminated phosphoric acid L which contained 36.4 weight% of $P_2O_5$ was obtained. The principal contaminants, which were initially contained in the crude acid, were found in the decontaminated acid in the following residual proportions in %, based on $P_2O_5$:

Fe<20 ppm
Al<20 ppm
Mg<10 ppm
Ca<20 ppm
V<3 ppm
Mn<2 ppm
$SO_4$<0.1%

There was also contained 3.85 metric tons of a secondary raffinate M which contained 6.0 weight% of $P_2O_5$. The total loss was 1.9 weight%, based on the $P_2O_5$-concentration in the crude acid. The secondary raffinate M was admixed in an unheated double screw mixer III with 0.53 metric ton of quicklime N. Water, which was evaporated during the vigorous reaction, was exhausted and 3.93 metric tons of a solid friable waste product O was obtained. A relatively small portion G of water-saturated amyl alcohol P, which came from the re-extraction stage V (acid decontamination) was mixed with sulfuric acid H and the mixture was recycled to unit II. The bulk portion Q of the alcohol was dehydrated in a continuously operated azeotropic distillation stage VI and recycled to the countercurrent unit I. Water R, which was separated during the distillation, was delivered to the scrubbing zone IV.

EXAMPLE 2:

A commercial grade crude phosphoric acid made from Florida-phosphate, which contained 50.0 weight% of $P_2O_5$ and the following principal contaminants in percent, based on $P_2O_5$, was used:

Fe—2.48 weight%
Al—1.60 weight%
Mg—0.56 weight%
Ca—0.13 weight%
V—260 ppm
Mn—760 ppm
$SO_4$—0.15 weight%

40.00 metric tons of this crude acid A and 5.55 metric tons of recycled scrubbing solution B were treated within 100 hours in a two-stage countercurrent extraction unit I with a mixture E comprising 78.73 metric tons of anhydrous amyl alcohol C, which came from an oxo-synthesis, and 38.71 metric tons of a secondary extract D, which came from a four-stage countercurrent extraction unit II. The mixture E comprising the two organic phases C and D contained 2.0 weight% of $H_2O$. 9.46 metric tons of almost solid primary raffinate F, which came from the countercurrent unit I, was delivered to the above four-stage countercurrent extraction unit II and contacted therein with the mixture S, which consisted of 35.28 metric tons of partially water-saturated amyl alcohol G which had a temperature of 78° C., contained 5.5 weight% of $H_2O$ and was admixed with 2.82 metric tons of concentrated sulfuric acid (96% of $H_2SO_4$). An average temperature of 55° C. was found to establish in unit II. 38.71 metric tons of secondary extract D, which came from this extraction unit, was used as described hereinabove. The treatment of the crude acid A in the countercurrent unit I gave 153.78 metric tons of primary extract J which contained 13.7 weight% of $P_2O_5$. It was scrubbed in a multistage scrubbing zone IV and re-extracted in a mono-stage re-extraction zone V with concentrated sodium hydroxide solution K (50 weight% NaOH) and 56.97 metric tons of a monosodium phosphate solution L which contained 33.3 weight% of $P_2O_5$ was obtained. The principal contaminants were found in the salt solution in the following residual proportions in %, based on $P_2O_5$:

Fe<20 ppm
Al<20 ppm
Mg<10 ppm
Ca<20 ppm
V<3 ppm
Mn<1 ppm
$SO_4$<0.1%

There was also obtained 8.65 metric tons of a secondary raffinate M which contained 11.3 weight% of $P_2O_5$. The total loss was 5.0 weight%, based on the $P_2O_5$-concentration in the crude acid. The secondary raffinate M was admixed in an unheated double screw mixer III with 1.11 metric tons of solid quicklime N. Water, which was evaporated, was exhausted and 8.66 metric tons of a solid friable waste product O was obtained. A relatively small portion G of hot partially water-saturated amyl alcohol P, which came from the re-extraction stage V was mixed with sulfuric acid H and the mixture was delivered to unit II. The bulk portion Q of the alcohol was dehydrated in a continuously operated azeotropic distillation stage VI and mixed, in the manner described above, with the secondary extract D. Water R, which was separated during the distillation, was delivered to the scrubbing zone IV.

We claim:

1. In the process for purifying wet-processed phosphoric acid, wherein the phosphoric acid to be decontaminated is extracted countercurrently with an organic solvent which is partially miscible with water and capable of absorbing phosphoric acid, the resulting organic phosphoric acid solution, termed extract, is separated from contaminants unabsorbed by the solvent, termed raffinate; the decontaminated phosphoric acid is recovered from the solvent either in the form of free acid by reextracting the organic phosphoric acid solution with water, or in the form of an alkali metal phosphate by reacting the organic phosphoric acid solution with an alkali, the remaining organic solvent is recycled to the process and the said raffinate is treated countercurrently with a solvent containing a mineral acid, the improvement which comprises:

(a) carrying out the extraction in two extraction zones I and II separated from one another, wherein in zone I a primary extract and a primary raffinate and in zone II a secondary extract and a secondary raffinate is formed, (b) dividing the recycled organic solvent containing water in a first and a second portion, (c) after dehydrating mixing the first solvent portion and the secondary extract originating from extraction zone II containing phosphoric acid and more than 0 up to at most 10 weight % of water, both in a ratio by weight necessary to ensure the formation of a mixture containing more than 0 and less than 50% of water that would correspond to the saturation concentration of water in the solvent; and in a quantity sufficient to absorb all of the liquid phosphoric acid contained in the crude phosphoric acid which is to be decontaminated, and all of the uncombined water present in the said wet-processed phosphoric acid, (d) contacting countercurrently within the extraction zone I the mixture obtained in step (c) and the said crude phosphoric acid with the resultant formation of the said primary extract and the primary raffinate, (e) forming the secondary extract and the secondary raffinate by delivering the primary raffinate into the extraction zone II, there contacting the primary raffinate countercurrently with a mixture consisting of a mineral acid and the second portion of the solvent containing water, said mixture containing the mineral acid in a quantity necessary to provide 1 acid equivalent per 1 g atom of phosphorous, contained in the primary raffinate, and removing the remaining secondary raffinate from the extraction zone II, and (f) recovering the purified phosphoric acid from the primary extract.

2. The process as claimed in claim 1, wherein the primary raffinate is extracted at temperatures of 0° to 98° C.

3. The process as claimed in claim 2, wherein the raffinate is extracted at 20° to 60° C.

4. The process as claimed in claim 1, wherein the quantity of anhydrous first solvent portion used is selected in accordance with the $P_2O_5$-concentration in the wet-processed phosphoric acid which is to be decontaminated, increasing quantities of solvent being used for a decreasing $P_2O_5$-concentration in the acid.

5. The process as claimed in claim 4, wherein, in the event of the solvent being a $C_5$-alcohol and the acid containing 50, 40 or 30 weight% of $P_2O_5$, respectively, about 2.5, 6 or 9 parts by volume of alcohol are used per part by volume of acid.

6. The process as claimed in claim 1, wherein the countercurrent extraction of the primary raffinate is effected in 2 to 10 extraction stages.

7. The process as claimed in claim 6, wherein the extraction is effected in 3 to 5 extraction stages.

8. The process as claimed in claim 1, wherein the primary raffinate is extracted by using the second portion of the solvent and primary raffinate in a ratio by volume of 4:1 to 8:1.

9. The process as claimed in claim 8, wherein the solvent and raffinate are used in a ratio by volume of about 6:1.

10. The process as claimed in claim 1, wherein the first solvent portion is dehydrated by azeotropic distillation and the water distilled off is used for scrubbing the primary extract before recovering the phosphoric acid therefrom.

11. The process as claimed in claim 10, wherein the scrubbing solution obtained is admixed to the crude phosphoric acid before delivering it, into the extraction zone I.

12. The process as claimed in claim 1, wherein the organic solvent used is a $C_5$-alcohol.

13. The process as claimed in claim 1, wherein the mineral acid is used in concentrated form.

14. The process as claimed in claim 1, wherein sulfuric acid is used as the mineral acid.

15. The process as claimed in claim 1, wherein the secondary raffinate is reacted with quicklime and converted to a solid neutral waste product.

16. The process as claimed in claim 1, wherein the secondary extract is mixed with the first anhydrous solvent portion in a ratio by weight necessary for the resulting mixture to contain a proportion of water which corresponds to 10–30% of the saturation concentration of water in the solvent.

* * * * *